United States Patent
Plote et al.

(10) Patent No.: US 7,055,309 B2
(45) Date of Patent: Jun. 6, 2006

(54) METHOD AND DEVICE FOR CONTROLLING AN INTERNAL COMBUSTION ENGINE

(75) Inventors: Holger Plote, Linz (DE); Andreas Krautter, Steinheim (DE); Michael Walter, Kornwestheim (DE); Juergen Sojka, Gerlingen (DE); Matthias Stegmaier, Boeblingen/Rems (DE); Thomas Zein, Stuttgart (DE); Matthias Mansbart, Fellbach-Oeffingen (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 10/366,270

(22) Filed: Feb. 13, 2003

(65) Prior Publication Data

US 2003/0225506 A1 Dec. 4, 2003

(30) Foreign Application Priority Data

Mar. 27, 2002 (DE) .......................... 102 13 660

(51) Int. Cl.
*F01N 3/00* (2006.01)

(52) U.S. Cl. ............................. 60/277; 60/274; 60/285; 60/287; 60/297; 60/311

(58) Field of Classification Search .................. 60/274, 60/277, 285, 287, 291, 295, 297, 311, 323
See application file for complete search history.

(56) References Cited

U.S. PATENT DOCUMENTS

| 4,516,993 A | * | 5/1985 | Takeuchi et al. | ............... 55/283 |
| 5,233,831 A | * | 8/1993 | Hitomi et al. | ................ 60/284 |
| 5,716,586 A | * | 2/1998 | Taniguchi | .................... 422/173 |
| 6,405,528 B1 | * | 6/2002 | Christen et al. | ............... 60/295 |
| 6,622,480 B1 | * | 9/2003 | Tashiro et al. | ................ 60/295 |

FOREIGN PATENT DOCUMENTS

DE     199 06 287     8/2000

* cited by examiner

*Primary Examiner*—Binh Q. Tran
(74) *Attorney, Agent, or Firm*—Kenyon & Kenyon

(57) ABSTRACT

A method and a device for controlling an internal combustion engine, in which a first quantity characterizing the flow resistance of a first component of the exhaust-gas treatment system is determined based on a first measured quantity and a volumetric-flow quantity, and the volumetric-flow quantity is determined based on a second quantity which characterizes the flow resistance of a second component of the exhaust system.

16 Claims, 4 Drawing Sheets

METHOD AND DEVICE FOR CONTROLLING AN INTERNAL COMBUSTION ENGINE

FIELD OF THE INVENTION

The present invention relates to a method and a device for controlling an internal combustion engine, such as, for example, an internal combustion engine having an exhaust-gas treatment system that may include a particulate filter.

BACKGROUND INFORMATION

To improve emissions, vehicles, such as, for example, vehicles having diesel engines, may be equipped with particulate filters. For controlling such exhaust-gas treatment systems and/or for monitoring the condition of such exhaust-gas treatment systems, a variable may be evaluated which characterizes the flow resistance of the exhaust-gas treatment system or of individual components such as, for example, the particulate filter. The monitoring of the filter load in the case of particulate filters and the regeneration monitoring may be performed using pressure sensors, since the pressure drop through the filter may permit conclusions about the soot mass collected in the filter. The differential pressure to be measured through the filter may also be a function of the volumetric exhaust-gas flow.

In passenger-car engines having exhaust-gas recirculation, an air-mass sensor may be available whose measuring signal may also be used for determining the volumetric exhaust-gas flow. Should this sensor be dispensed with, or if a system exists without an exhaust-gas mass sensor, the volumetric exhaust-gas flow may not be readily determined, since this variable may not be measured directly, or doing so may cause undesirable expense.

SUMMARY OF THE INVENTION

An exemplary embodiment and/or exemplary method of the present invention may permit precise control and/or regulation of the exhaust-gas treatment system without an air-mass sensor.

In an exemplary method and/or an exemplary device for controlling an internal combustion engine, a first quantity characterizing the flow resistance of a first component of the exhaust-gas treatment system may be determined on the basis of a first measured quantity and a volumetric-flow quantity, the volumetric-flow quantity being determined on the basis of a second quantity which characterizes the flow resistance of a second component of the exhaust-gas system, an exact control and/or regulation of the internal combustion engine, such as, for example, an exhaust-gas treatment system, may be provided without the use of an air-mass sensor.

In one exemplary embodiment for the control of the internal combustion engine, the first quantity used, which, for example, may characterize the load condition of a particulate filter, may be ascertained on the basis of the differential pressure through the particulate filter and the volumetric exhaust-gas flow, the volumetric exhaust-gas flow being determined based on the differential pressure through a further component of the exhaust-gas treatment system and a known and/or easily ascertainable second quantity which corresponds to the first quantity in the case of the first component.

In one exemplary embodiment, the volumetric exhaust-gas flow may be used as the volumetric-flow quantity (VS). Alternatively, other variables characterizing the volumetric exhaust-gas flow may also be used.

The volumetric-flow quantity (VS) may be determined on the basis of a second measured quantity, which may characterize the differential pressure between the input and output of the second component, and the second quantity which characterizes the flow resistance of the second component. As a rule, no further sensors may be required to detect these quantities. In particular, the second quantity may be a fixed quantity which may be stored in a characteristic map. A particularly exact control may result by storing the values as a function of the operating state of the internal combustion engine and/or the environmental conditions.

In one exemplary embodiment, the second component may be a muffler. Alternatively, other components may also be used in the exhaust branch. A condition for the use of the component may include the condition that the same exhaust-gas mass flows through it, and that the flow resistance or a corresponding quantity is known and/or is easily ascertainable.

The first measured quantity may be the differential pressure between the input and output of the first component and/or a quantity which characterizes the differential pressure. The second measured quantity may be the differential pressure between the input and output of the second component and/or a quantity which characterizes the differential pressure.

The first quantity which characterizes the flow resistance of the first component may be ascertained on the basis of the first measured quantity and the volumetric-flow quantity.

DETAILED DESCRIPTION

Figure 1:
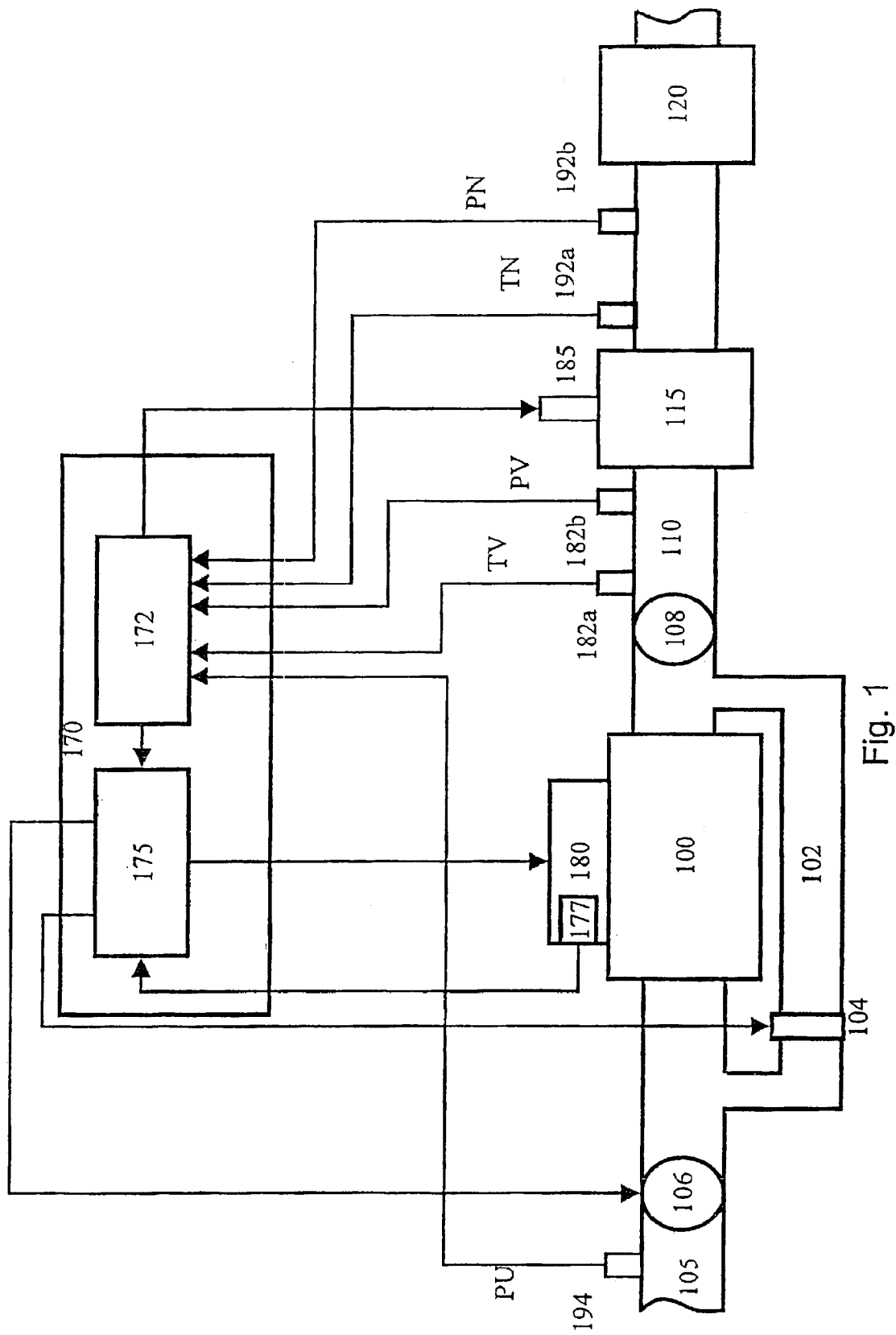
FIG. 1 shows a block diagram of a system for controlling an internal combustion engine.

FIG. 1 shows elements of an exhaust-gas treatment system of an internal combustion engine. The internal combustion engine is denoted by 100. It is supplied with fresh air through a fresh-air pipe 105. The exhaust gases of internal combustion engine 100 enter into the environment through an exhaust pipe 110. An exhaust-gas treatment system 115 is arranged in the exhaust pipe. This may be a catalytic converter and/or a particulate filter. Moreover, several catalytic converters may be provided for different pollutants, or combinations of at least one catalytic converter and one particulate filter.

A muffler 120 may be arranged downstream of exhaust-gas treatment system 115.

Also provided is a control unit 170 which includes at least an engine control unit 175 and an exhaust-gas treatment control unit 172. Engine control unit 175 applies control signals to a fuel metering system 180. Exhaust-gas treatment control unit 172 applies control signals to engine control unit 175 and, in one exemplary embodiment, to a control element 185 which is arranged in the exhaust pipe upstream of the exhaust-gas treatment system or in the exhaust-gas treatment system.

Moreover, various sensors may be provided which feed signals to the exhaust-gas treatment control unit and to the engine control unit. Thus, for example, a first sensor 194 is provided which supplies signals that characterize pressure PU of the ambient air. A second sensor 177 delivers signals characterizing the state of fuel metering system 180. Sensors 182a and 182b deliver signals characterizing the condition of the exhaust gas upstream of the exhaust-gas treatment system. Sensors 192a and 192b supply signals which characterize the condition of the exhaust gas downstream of the exhaust-gas treatment system and upstream of muffler 120.

Sensors 182a and 192a may be used to detect temperature values TV and/or TN, and/or sensors 182b and 192b may be used to detect pressure values PV and/or PN.

Moreover, sensors may also be used which characterize the chemical composition of the exhaust gas and/or of the fresh air. They are, for example, Lambda sensors, NOX sensors or HC sensors.

Exhaust-gas treatment control unit 172 may receive the output signals of sensors 182a, 182b, 192a, 192b and 194. The output signals of sensor 177 may be applied to engine control unit 175. Further sensors (not shown) may be provided which deliver a signal with respect to the driver's command or further ambient conditions or engine operating states.

In the exemplary embodiment shown, a compressor 106 is disposed in induction pipe 105, and a turbine 108 is arranged in exhaust pipe 110. The turbine is driven by the exhaust gas flowing through, and drives compressor 106 via a shaft (not shown). The air quantity which the compressor compresses may be controlled by suitable triggering.

Furthermore, pipe 110 is connected via an exhaust-gas recirculation pipe 102 to induction pipe 105. Disposed in exhaust-gas recirculation pipe 102 is an exhaust-gas recirculation valve 104 which is likewise controllable by control unit 175.

In the exemplary embodiment shown, both an exhaust-gas recirculation and a controllable exhaust-gas turbocharger are provided. According to an exemplary embodiment of the present invention, only an exhaust-gas recirculation, and/or only a controlled exhaust-gas turbocharger, may be provided.

The engine control unit and the exhaust-gas treatment control unit may form one structural unit. However, provision may also be made for them to be configured as two spatially separated control units.

In the following, an exemplary procedure according to the present invention is described using as an example a particulate filter which is utilized particularly for direct-injection internal combustion engines. However, the exemplary procedure according to the invention is not limited to this use; it may also be used for other internal combustion engines having an exhaust-gas treatment system. It may be used, for example, for exhaust-gas treatment systems featuring a combination of a catalytic converter and a particulate filter. Moreover, it may be usable in systems which are equipped only with a catalytic converter.

On the basis of the available sensor signals, engine control 175 calculates control signals to be applied to fuel metering system 180. The fuel metering system then meters the corresponding fuel quantity to internal combustion engine 100. During combustion, particulates may develop in the exhaust gas. They are trapped by the particulate filter in exhaust-gas treatment system 115. In the course of operation, corresponding amounts of particulates accumulate in particulate filter 115. This may impair the functioning of the particulate filter and/or the internal combustion engine. Therefore, provision is made for a regeneration process to be initiated at certain intervals or when the particulate filter has reached a certain loading condition. This regeneration may also be referred to as special operation.

The loading condition is detected, for example, on the basis of various sensor signals. Thus, first of all, the differential pressure between the input and the output of particulate filter 115 may be evaluated. Secondly, the loading condition on the basis of different temperature and/or different pressure values may be ascertained. In addition, further variables to calculate or simulate the loading condition may be utilized. A suitable procedure may be described in German Published Patent Application No. 199 06 287.

When the exhaust-gas treatment control unit detects that the particulate filter has reached a certain loading condition, the regeneration is initialized. There are various ways to regenerate the particulate filter. Thus, first of all, provision may be made for certain substances to be fed to the exhaust gas via control element 185, which then cause a corresponding reaction in exhaust-gas treatment system 115.

Provision may be made to determine the loading condition on the basis of different variables. By comparison to a threshold value, the different conditions are recognized and the regeneration is initiated as a function of the detected loading condition. The flow resistance of the particulate filter may be used as a variable characterizing the loading condition. The flow resistance may be determined on the basis of the differential pressure through the particulate filter and the volumetric flow through the particulate filter.

If the internal combustion engine does not include an air-mass flow sensor, then the volumetric flow through the particulate filter may not be readily ascertained. The procedure described in the following permits determination of the volumetric exhaust-gas flow, and thus an exact monitoring of the loading and regeneration of a particulate filter., even for internal combustion engines without an air-mass flow sensor, for example, in the case of truck engines.

According to an exemplary embodiment and/or exemplary method of the present invention, the exhaust-gas system includes an absolute-pressure sensor downstream of the diesel particulate filter, in order to determine the pressure drop through muffler 120. The exhaust-gas mass flow through the muffler may be determined on the basis of the known flow resistance of the muffler. Since the same exhaust-gas volume flows through both the muffler and the particulate filter, the flow resistance of the particulate filter may be determined on the basis of the differential pressure through the particulate filter and the volumetric exhaust-gas flow thus determined.

Therefore, according to an exemplary method of the invention, in a first step 200, differential pressure DP2 between the input and the output of the muffler is detected. To this end, provision may be made first of all to use a differential-pressure sensor, or to use one absolute-pressure sensor 192b which detects pressure PN upstream of the muffler, and a second absolute-pressure sensor 194 which detects pressure PU downstream of the muffler. The pressure downstream of the muffler usually corresponds to atmospheric pressure PU, which is already detected and evaluated for other purposes by the control unit.

In a second step 210, flow resistance W2 of the muffler is determined. In one exemplary embodiment, a fixed value may be read out from a memory. In another exemplary embodiment, this value W2 may be determined on the basis of various operating parameters such as engine speed N and the load, or a variable characterizing the load such as the injection quantity.

In a next step 220, based on flow resistance W2 and differential pressure DP2, volumetric exhaust-gas flow VS through the muffler is determined according to the following formula:

$$VS=DP2/W2$$

In the next step 230, differential pressure DP1 through the particulate filter is then determined correspondingly as in step 200, that is to say, first of all a differential-pressure sensor, or two absolute-pressure sensors 182$b$ and 192$b$ may be used.

In subsequent step 240, flow resistance W1 of the particulate filter is then determined based on differential pressure DP1 and volumetric flow VS according to the following formula:

$$W1=DP1/VS$$

Flow resistance W1 of the particulate filter is used for controlling and/or monitoring the particulate filter.

Volumetric-flow variable VS may be used for further controls and/or diagnostic tasks, particularly for the exhaust system and/or for controlling the exhaust-gas recirculation rate.

Figure 2:
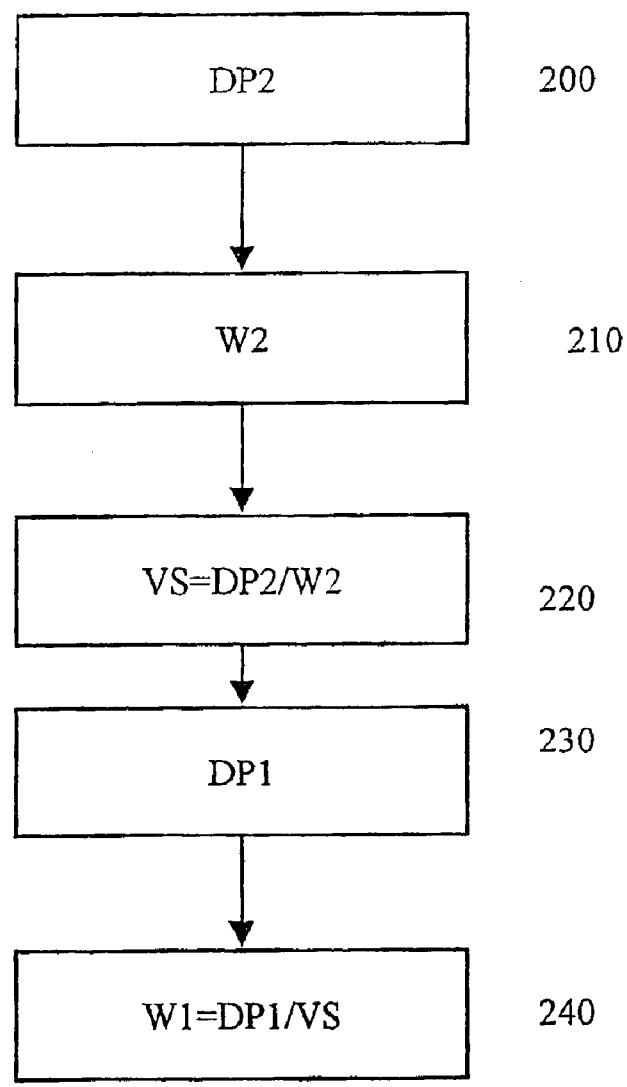
FIG. 2 shows a flow chart for an exemplary method of the present invention.

In the case of the exemplary embodiment described in FIG. 2, depending on the specific embodiment, a constant flow resistance W2 of the muffler or a flow resistance W2 as a function of the operating state, particularly the engine speed and the quantity of fuel injected, may be assumed. The use of an additional temperature sensor may increase accuracy.

Figure 3:
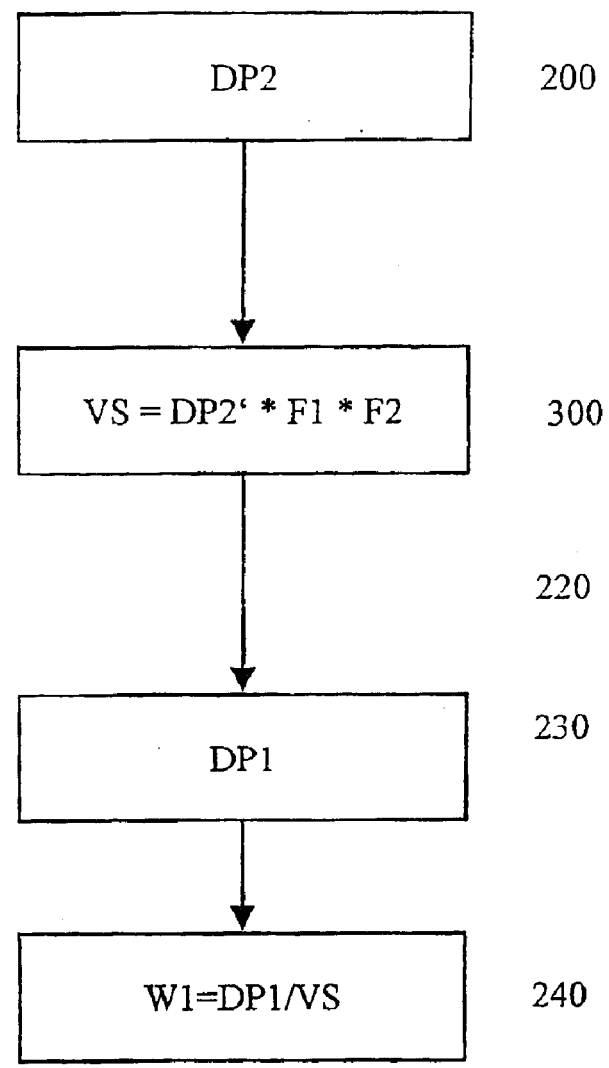
FIG. 3 shows a flow chart for a further exemplary embodiment.

In the exemplary embodiment shown in FIG. 3, volumetric exhaust-gas flow V2 is simulated by a replica of the muffler, through a pipe traversed by flow. In this context, valid for volumetric flow VS is the equation:
VS=F1*F2* DP2' of various factors F1, F2 and DP2'. Variable F1 is one or more temperature-dependent characteristic quantities which may be stored in a characteristic map as a function of the exhaust-gas temperature. Factor F2 may include geometric characteristic quantities of the muffler which may be determined experimentally. Variable DP2' may be a quantity determined by the differential pressure through the muffler.

The exemplary embodiment of FIG. 3 may differ from the exemplary embodiment according to FIG. 2 in that steps 210 and 220 are replaced by step 300. In step 300, volumetric exhaust-gas flow VS is determined with the aid of the formula indicated. In this context, variables F1 and F2 characterize the flow resistance of the muffler.

In contrast to the exemplary embodiment of FIG. 2, the flow resistance is not determined directly, but rather the volumetric exhaust-gas flow may be formed by multiplication of a plurality of factors F1, F2 and DP2'.

Figure 4A:
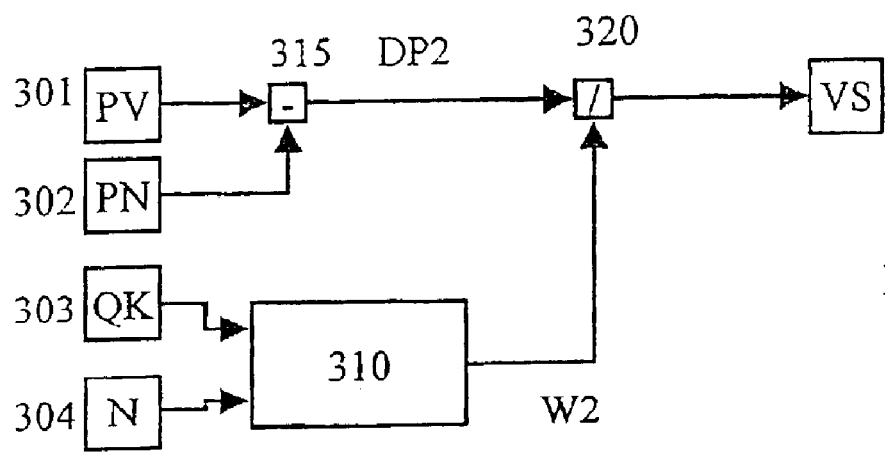
FIG. 4a shows a block diagram of an exemplary device according to the present invention.
Figure 4B:
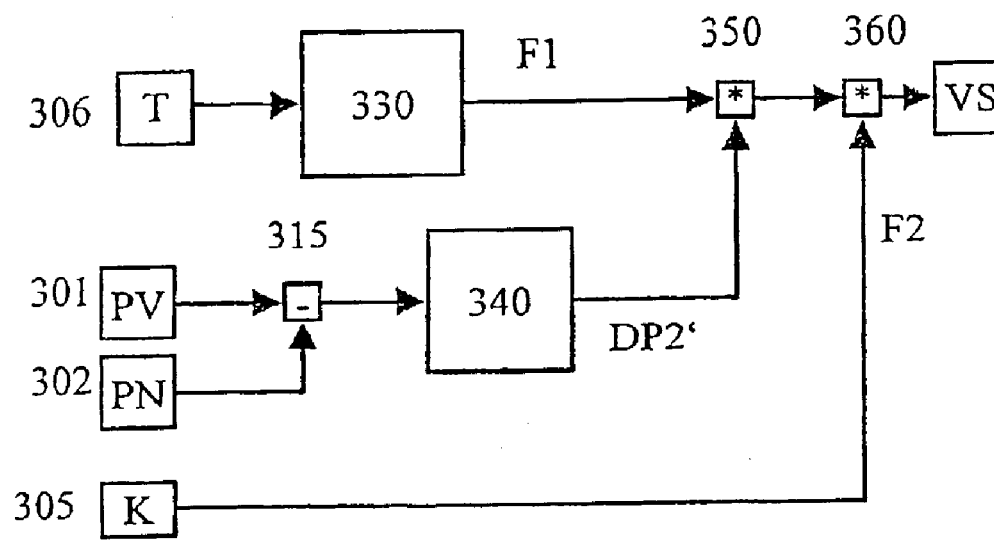
FIG. 4b shows a block diagram of another exemplary device according to the present invention.

In FIGS. 4$a$ and 4$b$, the two exemplary embodiments are shown as a block diagram. In the exemplary embodiment according to FIG. 4$a$, two sensors are provided which ascertain the pressure upstream and the pressure downstream of the muffler. They may also be replaced by a differential-pressure sensor. A first signal stipulation arrangement 301 supplies a signal PV which characterizes pressure PV upstream of the muffler, and a second signal specification arrangement 302 delivers a signal PN characterizing the pressure downstream of the muffler. Moreover, a third signal specification arrangement 303 delivers a variable QK which characterizes fuel quantity QK to be injected, and a fourth signal specification arrangement 304 supplies a signal with respect to the speed of the internal combustion engine.

The first, second and fourth signal specification arrangements may be sensors; the third signal specification arrangement may be the control unit in which the quantity of fuel to be injected is present as an internal variable. Alternatively, other variables may also be formed internally in the control unit based on different operating parameters. Moreover, further operating parameters may be taken into account.

The signals with respect to fuel quantity QK to be injected and the engine speed arrive at a characteristic map 310 at whose output flow resistance W2 of the muffler is present. Output signals PV and PN arrive at a subtractor 315 which outputs differential pressure DP2 through the muffler as an output quantity. The two quantities DP2 and W2 arrive at a division point 320 at whose output, volumetric exhaust-gas flow VS is present.

This means that the flow resistance of the muffler is stored in characteristic map 310 as a function of various operating parameters. Based on the differential pressure, which is measured by sensors, and flow resistance W2 of the muffler, the volumetric exhaust-gas flow is then calculated by division.

In the exemplary embodiment according to FIG. 4$b$, in addition to the first and second signal specifications, a fifth signal specification 305 which specifies a constant quantity F2, and a sixth signal specification 306 which delivers a temperature signal T are provided. Output signals PV and PN of the first and second signal specifications arrive at a subtractor 315 which outputs differential pressure DP2 through the muffler as an output quantity. The output signal of subtraction point 315 arrives at a characteristic map 340 at which a quantity DP2' is present which is a function of the differential pressure. Output signal T of sixth signal specification 306 arrives via a characteristic curve 330, in which the temperature dependence of physical quantities of the volumetric exhaust-gas flow is stored, at a node 350. The output signals of the two characteristic maps are combined multiplicatively in node 350. The output signal of node 350 arrives at a node 360, at whose second input, output signal F2 of fifth signal specification 305 is applied.

This block diagram is intended to simulate the formula above. Volumetric flow VS is calculated by multiplication on the basis of a first factor F1, a second factor F2 and a quantity DP2' which is a function of the differential pressure through the muffler. Factor F1 takes into account one or more temperature-dependent characteristic quantities which may be stored in a characteristic map and/or in one or more characteristic curves as a function of the exhaust-gas temperature. Factor F2 may include geometric characteristic quantities of the muffler which should be constant.

Furthermore, the implementations may be in the form of a computer program having program-code arrangement, and in the form of a computer program product having program-code arrangement. The computer program according to an exemplary embodiment of the present invention has a program-code arrangement for carrying out all the steps of the method according to the invention when the program is executed on a computer, particularly a control unit for an internal combustion engine of a motor vehicle.

Thus, in this case, an exemplary embodiment of the present invention may be implemented by a program stored in the control unit, so that this control unit provided with the program constitutes the present invention in the same manner as the exemplary method, for whose execution the program may be suitable. The computer program product according to the exemplary embodiment of the present invention has a program-code arrangement which may be stored on a machine-readable data carrier in order to carry out the exemplary method of the present invention when the program product is executed on a computer, such as, for example, a control unit for an internal combustion engine of a motor vehicle.

Thus, in this case the exemplary embodiment of the present invention may be implemented by a data carrier, so that the exemplary method of the present invention may be carried out when the program product, i.e. the data carrier, is integrated into a control unit for an internal combustion engine, particularly of a motor vehicle. In particular, an electrical storage medium, e.g. a read-only-memory (ROM), an EPROM or even an electrical permanent storage such as a CD-ROM or DVD may be used as data carrier, i.e. as computer program product.

What is claimed is:

1. A method for controlling an internal combustion engine, comprising:
   determining a first quantity which characterizes a flow resistance of a first component of an exhaust-gas treatment system based on a first measured quantity and a volumetric-flow quantity; and
   determining the volumetric-flow quantity based on a second quantity which characterizes a flow resistance of a second component of the exhaust-gas treatment system.

2. The method of claim 1, wherein the volumetric-flow quantity characterizes the volumetric exhaust-gas flow.

3. The method of claim 1, further comprising:
   determining the volumetric-flow quantity based on a second measured quantity which characterizes a differential pressure between an input and an output of the second component, and the second quantity which characterizes the flow resistance of the second component.

4. The method of claim 1, wherein the second component is a muffler.

5. The method of claim 1, wherein a first measured quantity characterizes a differential pressure between an input and an output of the first component.

6. The method of claim 5, further comprising:
   ascertaining the first quantity, which characterizes the flow resistance of the first component, based on the first measured quantity and the volumetric-flow quantity.

7. A device for controlling an internal combustion engine, comprising:
   a first component arranged in an exhaust-gas treatment system having a flow resistance characterizable by a first quantity determinable based on a first measured quantity and a volumetric-flow quantity;
   a second component arranged in the exhaust-gas treatment system; and
   an arrangement to determine the volumetric-flow quantity based on a second quantity which characterizes the flow resistance of the second component of the exhaust-gas treatment system.

8. A computer program, comprising:
   a program-code arrangement to determine a first quantity which characterizes a flow resistance of a first component of an exhaust-gas treatment system based on a first measured quantity and a volumetric-flow quantity, and to determine the volumetric-flow quantity based on a second quantity which characterizes a flow resistance of a second component of the exhaust-gas treatment system, the program-code arrangement being executable on a computer.

9. The computer program of claim 8, wherein the program is executable in a control unit for an internal combustion engine.

10. A computer program product, comprising:
    a program-code arrangement to determine a first quantity which characterizes a flow resistance of a first component of an exhaust-gas treatment system based on a first measured quantity and a volumetric-flow quantity, and to determine the volumetric-flow quantity based on a second quantity which characterizes a flow resistance of a second component of the exhaust-gas treatment system, the program-code arrangement being storable on a machine-readable data carrier and executable on a computer.

11. The computer program product of claim 10, wherein the program code arrangement is executable in a control unit for an internal combustion engine.

12. The method of claim 4, wherein the first component is a particulate filter.

13. The method of claim 12, wherein the first component is a diesel particulate filter.

14. The method of claim 1, wherein the first component is a particulate filter and the second component is a muffler, and wherein the first measured quantity is a differential pressure through the particulate filter and the second measured quantity is a differential pressure through the muffler.

15. The device of claim 7, wherein the first component is a particulate filter and the second component is a muffler.

16. The device of claim 15, wherein the arrangement to determine the volumetric-flow quantity includes an absolute pressure sensor arranged to determine the pressure drop through the muffler.

* * * * *